Patented Feb. 27, 1951

UNITED STATES PATENT OFFICE 2,543,335

PROCESS FOR POLYMERIZING DIVINYL BENZENE AND POLYOLEFINIC ESTERS

Benjamin Phillips, Jr., and William M. Quattlebaum, Jr., Charleston, W. Va., assignors, by mesne assignments, to Union Carbide and Carbon Corporation, a corporation of New York No Drawing. Application November 16, 1946, Serial No. 710,400

9 Claims. (Cl. 260—73)

This invention relates to an improved process for polymerizing polyfunctional monomers of the group consisting of divinylbenzene and unsaturated esters which contain at least two polymerizable ethylenic double bonds in the molecule.

The artificial resins formed from these polyfunctional monomers differ profoundly from the synthetic resins formed by polymerizing monofunctional monomers, such as the vinyl esters of monofunctional acids or the alkyl acrylates. In the latter instance, it has been postulated that the polymerization of monofunctional monomers proceeds with the formation of macromolecules which are thread-like or linear in structure. Regardless of the validity of this theory, the observed fact is that solutions of these monofunctional monomers containing organic peroxides may be heated to form viscous solutions of the corresponding polymers. By this method a preponderant proportion of the monomers present in a batch may be polymerized to resins of high molecular weight.

On the other hand, the theory has been proposed that the polyfunctional monomers polymerize to form macromolecules which are three-dimensional in structure. Depending on the degree of polymerization, these macromolecules may be divided into two classes. The polymers of lower molecular weight are, in general, fusible, and soluble in the usual organic solvents such as esters and ketones. On further polymerization the polymers become infusible, and insoluble in the common organic solvents. In this behavior, resins derived from polyfunctional monomers are analogous to the common thermosetting resins, such as the phenol-formaldehyde resins. In the manufacture of artificial resins from these polyfunctional monomers it has proved desirable to conduct the polymerization in two stages. The first stage is carried out to yield a fusible resin. The fusible resin may then be mixed with additional quantities of polymerization catalysts and other modifying ingredients and further polymerized. This subsequent polymerization may occur in a mold, in which event infusible molded articles are obtained, or it may occur on baking a film of the fusible resin supported on a surface, in which event solvent-resistant coatings are obtained.

In practice it has proved a matter of some difficulty to carry out the polymerization of polyfunctional monomers in two stages. This is because the polymerization proceeds through both stages if the conversion of more than a small fraction of monomer to resin is attempted. This is particularly true if the polyfunctional monomers are polymerized in the absence of solvents. For instance, according to British Patent 571,496, in the polymerization of diallyl phthalate at a temperature of 80° to 110° C. in the presence of a few per cent. of benzoyl peroxide, gelation occurs when approximately 15% of the monomer has been converted to resin. Similar results are reported by Simpson, Journal of the Society of Chemical Industry 65, p. 107, April 1946.

The polymerization of polyfunctional monomers in the presence of solvents has been suggested as a means of increasing the yield of fusible polymer. However, it has been shown in U. S. Patent 2,273,891 that this method is not very effective unless the solutions are made quite dilute, which necessitates recovering and purifying many times the quantity of solvent for each part of resin made. For instance, according to this patent, the yield of fusible polymer in polymerizing allyl or methallyl methacrylate in 40% to 50% solutions of the monomer in solvents is very low, often not in excess of 5% by weight of the theoretical yield.

According to the present invention, it has been found that high yields of fusible resin, i. e. up to 85% to 90% of the theoretical, may be obtained by polymerizing the polyfunctional monomers in the presence of aliphatic aldehydes. By this method it is possible to obtain higher yields of fusible polymers at more rapid rates of polymerization than is possible through the known use of organic solvents, such as acetone, to control the polymerization. For instance, when a solution containing 100 parts of diallyl maleate, 400 parts of acetone, and 4 parts of dibenzoyl peroxide was heated under reflux, a period of twenty-four hours was required to obtain a 40% yield of fusible polymer. Upon adding two more parts of dibenzoyl peroxide gelation occurred after nine hours, at which time 55% of the monomer had polymerized to a resin. On the other hand, when a mixture of 100 parts of diallyl maleate, 200 parts of butyraldehyde, and four parts of dibenzoyl peroxide were heated under reflux a yield of 85% to 90% of fusible polymer was obtained in 5 to 7 hours. Upon further heating of the mixture gelation occurred.

In polymerizing polyfunctional monomers in the presence of aldehydes, a portion of the reaction mixture may be analyzed to determine the degree of conversion, and the polymerization discontinued before gelation occurs. Polymerization may be stopped by cooling the reaction mixture and then distilling the volatile aldehydes under reduced pressure from the mixture. This method is particularly effective in recovering those resins which at room temperatures are viscous, slowly flowable liquids, since such resins may be obtained as a still residue. If the fusible resins are solids, they are more conveniently recovered by precipitating them with a non-solvent of the class consisting of ethers, alcohols, and aliphatic hydrocarbons, such as diethylether, dibutyl ether, methanol, isopropanol, butanol, pentane or hexane. A suitable amount of precipitant is usually from two to ten parts of precipitant per part of the mixture containing the polymer. Before isolating the fusible polymer the polymerization may be carried to the point of incipient gelation, or it may be discontinued at the desired conversion of monomer to resin, for instance at 25%, 33%, or 50% conversion, but well short of the point of incipient gelation. The fusible resins which are isolated before the point of incipient gelation is reached are of lower molecular weight and they form less viscous solutions than the resins which are isolated at the point of incipent gelation. The fusible resins thus earlier isolated also exhibit better flow properties during molding or laminating operations.

On the other hand, if the polymerization is carried to the point of incipient gelation in the presence of aldehydes, very little unpolymerized monomer remains in the mixture. It is not necessary to remove such monomer as its presence during the second stage of the polymerization improves the flow characteristics of the polymer during the molding or laminating operations during which the second stage polymerization occurs.

The amount of aldehyde required in the process is not excessive. In general, at least one-half part of aldehyde for each part of polyfunctional monomer by weight is required in order to secure a high yield of fusible polymer. In general, from one-half part to three parts of aldehyde may be used for each part of the polyfunctional monomer. When converted to the thermoset stage, resins formed using amounts of aldehyde within the lower portion of this range, have a higher modulus of elasticity, and this modulus is affected less by changes in temperature. On the other hand, when using amounts of aldehyde within the upper portion of said range, the fusible polymer obtained is softer and the thermoset product is less brittle. This quantitative effect of the aldehyde concentration is shown in the data to follow:

*Effect of aldehyde concentrations on physical properties of thermoset polydiallyl maleate*

| Per cent Butyraldehyde in aldehyde-monomer mixture | 33.3 | 66.6 | 71.5 |
|---|---|---|---|
| Density of resin at 20° C | 1.36 | 1.23 | 1.22 |
| Water absorption per cent, 24 hrs. at 25° C | 1.4 | 0.7 | 0.68 |
| Flexural modulus of elasticity, p. s. i | 500,000 | 356,000 | 335,000 |
| Flexural strength, p. s. i | | 12,000 | 5,000 |
| Heat distortion point, ° C., A. S. T. M | | 73 | 64 |
| Minimum time of conversion to infusible polymer, seconds at— | | | |
| 120° C | 40 | 80 | 110 |
| 140° C | 30 | 50 | 55 |
| 160° C | 10 | 25 | 35 |

The aliphatic aldehydes employed in the present process are saturated because the unsaturated aldehydes tend to inhibit the polymerization to an even greater degree than is strictly necessary. The aliphatic aldehydes of low molecular weight, such as acetaldehyde, propionaldehyde, butyraldehyde and 2-ethylhexaldehyde, are preferred because their volatility facilitates their removal from the polymerization mixtures by distillation. The aromatic aldehydes have only a slight effect on the polymerization and are excluded for this reason.

In some instances, such as the polymerization of diallyl maleate in the presence of butyraldehyde, the aldehyde appears to enter into the resin-forming reaction. In other instances the amount of aldehyde which enters the polymer is negligible. However, the effect of the aldehyde is substantially the same in both cases. The formation of insoluble polymer is retarded so that the polymerization may be carried to a high conversion before gelation occurs. In addition to this fact, the polymerization of polyfunctional monomers in the presence of aldehydes has other advantages. Fusible resins produced by this process may be molded more easily because of their superior flow properties, and the thermosetting reaction may be carried out in a short time. Also the fusible resins produced by this process are less subject to shrinkage during molding.

The polymerization of the polyfunctional monomers in the presence of aldehydes may be carried out solely by heating the mixtures at temperatures of about 40° C. to about 200° C. in the absence of catalysts. Preferably, however, about 0.4 to 4 parts by weight of an organic peroxide, such as benzoyl peroxide, or diacetyl peroxide, is added for each 100 parts of the unsaturated monomer. For a given quantity of aldehyde the speed of the polymerization is a direct function of the catalyst concentration and the temperature. Solvents such as acetone may be added, but their use would be quite incidental. Also the monomers may be emulsified or suspended in water and polymerized in this state.

Any polymerizable unsaturated ester of a carboxylic acid, the ester containing two or more ethylenic double bonds, may be polymerized by the process of this invention. As examples may be mentioned the diallyl esters of dibasic acids, such as maleic, fumaric, succinic, and phthalic acids, the divinyl esters of dibasic acids, such as succinc and sebacic acids, the esters of polyhydric alcohols with unsaturated acids, such as ethylene glycol diacrylate, and the allyl esters of monobasic unsaturated acids, such as acrylic, methacrylic and crotonic acids. These monomers may be polymerized alone, or two or more of the polyfunctional monomers may be copolymerized. Also one or more polyfunctional monomers may be copolymerized to form thermosetting resins with one or more monofunctional monomers, such as vinyl acetate, vinyl propionate, styrene, ethyl acrylate, butyl acrylate, or butyl methacrylate.

The resins prepared by the process of this invention may be used in the manufacture of surface coatings, laminated articles, molding compositions which may or may not contain fillers, and in the manufacture of other articles where thermosetting resins are commercially employed. The curing of the fusible resins may be accomplished by heating the resins at temperatures of 100° to 250° C. or by exposing them to ultraviolet light. A polymerization catalyst, such as dibenzoyl peroxide may be incorporated in the fusible resin to increase the rate of the thermosetting reaction, but this is not essential.

The following examples will illustrate the invention, all parts given being by weight unless otherwise specified:

*Example 1*

Diallyl maleate (100 parts) was added to butyraldehyde (200 parts) containing dibenzoyl peroxide (3 parts). The clear solution thus formed was heated under reflux, the boiling point being 82° C. After 32 hours a test showed that the mixture contained 89 parts of a polymer which could be isolated as a white powder by precipitation with diethyl ether. On further heating of the solution the mixture gelled. The overall rate of polymerization obtained in this experiment was lower than that obtained in the experiment previously described because less catalyst was used.

*Example 2*

A polymerization carried out as described in Example 1 was stopped by cooling when the solution contained 60 parts of precipitable polymer. The resin was isolated by precipitation with isopropanol and was purified by dissolving it in acetone and reprecipitating with isopropanol. The white granular polymer obtained was dried in a current of air for 2 hours at 50° C.

A small amount (about 50 grams) of acetone containing 2 grams of dibenzoyl peroxide was added to 100 grams of this resin. This mixture was then incorporated with 50 grams of wood flour on a roll mill. The acetone evaporated during the milling. When a sample of the milled sheet was heated in a mold at 150° C for fifteen minutes, a hard, strong, thermoset product was obtained.

*Example 3*

A mixture of 100 parts of diallyl maleate and 100 parts of butyraldehyde containing 0.4 part of diacetyl peroxide was heated at 83° C. for 16 hours. At the end of this time the solution contained 50 parts of a resin precipitable with diethyl ether. The butyraldehyde was removed by distillation under reduced pressure. There was obtained as a residue 119 parts of a clear, colorless resin which flowed very slowly at room temperature. Since the original mixture contained only 100 parts of diallyl maleate, it is concluded that the resin was composed of 16% of combined butyraldehyde and 84% of diallyl maleate. A small amount of the diallyl maleate was present as the monomer.

Dibenzoyl peroxide equal to 2% of the weight of the resin was added in acetone solution. The acetone was removed under reduced pressure. When a sample of the acetone-free material was baked at 100° C. for three hours a hard, thoroughly thermoset material was obtained. A similar product was obtained when another sample of the catalyzed resin was baked at 150° C. for 5 minutes.

*Example 4*

Styrene (50 parts), diallyl maleate (50 parts), and butyraldehyde (50 parts) were heated at 90° C. in the presence of dibenzoyl peroxide (4 parts). After 3.2 hours the mixture was viscous and contained 51 parts of a copolymer precipitable with isopropanol. The polymerization mixture was concentrated by distilling off the butyraldehyde under reduced pressure. Acetone containing 2 parts of dibenzoyl peroxide was added to the resin, and the acetone was then removed by distillation under reduced pressure, the temperature of the resin being kept below 60° C. during this step. The residue consisted of 100 parts of a colorless resin which was soft enough to flow slowly at room temperature. This resin contained some unpolymerized diallyl maleate. When a sample of the resin was baked at 110° C. for three hours, it was converted to a hard, insoluble, infusible product.

*Example 5*

Diallyl maleate (100 parts), acetaldehyde (200 parts), and dibenzoyl peroxide (3 parts) were heated together in a sealed tube at 80° C. After ten hours the mixture was very viscous, and the tube was cooled and opened. The resin was precipitated with diethyl ether, dissolved in acetone, again precipitated with diethyl ether and dried. Eighty-five parts of dry polymer was obtained. When the fusible polymer was baked at 150° C. for one hour it became hard, insoluble, and infusible.

*Example 6*

A solution containing 100 parts of divinyl sebacate, 200 parts of butyraldehyde, and 3 parts of dibenzoyl peroxide was heated under reflux for two hours. At the end of this time the mixture, which contained 36 parts of precipitable polymer, was quite viscous but had not gelled. It was poured into several times its volume of isopropanol. The resin which precipitated was dissolved in acetone and reprecipitated with isopropanol. The resin was again dissolved in acetone, and an amount of dibenzoyl peroxide equal to 2% of the weight of the resin was added. When a film prepared by the evaporation of the solvent from this solution was baked in an oven at 150° C. for half an hour, it became insoluble in all the common solvents and was much harder and less sensitive to temperature changes than it had been in the fusible state.

*Example 7*

A mixture consisting of diallyl maleate (25 parts), vinyl acetate (75 parts), butyraldehyde (50 parts), and dibenzoyl peroxide (4 parts) was heated under reflux for 50 minutes. The copolymer formed was precipitated with diethyl ether and later washed with diethyl ether. It was then dissolved in acetone and precipitated by pouring the solution into a large volume of water. The white granular resin obtained was isolated by filtration and dried for two hours at 50° C. Twenty-eight parts of dry resin was obtained.

A sample of the copolymer was dissolved in acetone along with 3% of dibenzoyl peroxide by weight of the resin. This solution was poured into water, and the precipitate, which consisted of a homogeneous dispersion of the peroxide in the resin, was filtered and dried. When the catalyzed resin was molded at 150° C. for 10 minutes, a hard thermoset product, which was insoluble in all the common solvents, was obtained.

*Example 8*

An emulsion was prepared by dispersing 25 grams of diallyl maleate, 25 grams of 2-ethylhexaldehyde, and 0.5 gram of dibenzoyl peroxide in 100 grams of water containing 2.5 grams of "Aerosol" OT, (dioctyl ester of sodium sulfosuccinic acid). The mixture was stirred mechanically and held at 90° C. for 1.3 hours. When the emulsion was poured into methanol, a white resin precipitated in finely divided form. The resin was washed with methanol and dried for two hours at 50° C. The weight of the dry resin was 10.5 grams.

A portion of the resin, which contained no polymerization catalyst, was molded for 10 minutes at 150° C. The sample was then removed from the mold and baked in an oven for one hour at 150° C. A hard, thoroughly thermoset product was obtained.

*Example 9*

Fifty parts of propylene glycol maleate, an unsaturated resinous ester containing a plurality of olefinic double bonds and having an acid number of 75 was dissolved in a mixture of 50 parts of diallyl maleate and 200 parts of butyraldehyde. Four parts of dibenzoyl peroxide was added, and the solution was heated under reflux for 4.5 hours. By precipitation with diethyl ether there was isolated 80 parts of a soluble, fusible resin, which was converted to a hard, infusible, insoluble material when baked in an oven for one hour at 150° C.

*Example 10*

Diallyl maleate (64 parts) and ethyl acrylate (36 parts) were heated under reflux with butyraldehyde (100 parts) and dibenzoyl peroxide (2 parts). At the end of 3.8 hours the mixture was cooled, and the resin was precipitated twice with isopropanol. The polymer was dissolved in acetone along with 7 parts of dibenzoyl peroxide and was then precipitated with water and dried in a vacuum drier for 20 hours at 40° C. Fifty-five parts of dry resin was obtained. When a sample of the resin was molded at 145° C. for 10 minumes, a hard thermoset product resulted.

*Example 11*

Diallyl maleate (70 parts), divinyl sebacate (30 parts), butyraldehyde (200 parts), and dibenzoyl peroxide (4 parts) were mixed and heated under reflux for 5.5 hours. The copolymer was precipitated twice with ether and dissolved in acetone. A determination of the resin content of the acetone solution showed that 60 parts of copolymer had been formed. Dibenzoyl peroxide (1.2 parts) was dissolved in the acetone solution, which was then evaporated to dryness under reduced pressure. A sample of the catalyzed resin was molded at 140° C. for 15 minutes. The thermoset product was hard and insensitive to temperature changes.

*Example 12*

A solution consisting of 100 parts of divinyl benzene, 200 parts of butyraldehyde, and 2 parts of dibenzoyl peroxide was heated under reflux for twenty minutes. The polymerization was stopped by cooling the mixture, and the polymer was precipitated by pouring the solution into isopropanol. Twenty parts of a white powdery resin was isolated. When this resin was baked at 150° C. for half an hour, it thermoset to a hard product which was not appreciably swollen by benzene. The yield of polymer may be increased to 25% by carrying out the heating for a longer period. Still higher yields can be obtained by the use of a greater amount of butyraldhyde.

We claim:

1. Process for making artificial resins which comprises mixing a polyfunctional monomer of the group consisting of divinyl benzene and unsaturated esters of carboxylic acids, the esters containing at least two polymerizable ethylenic linkages, with an organic peroxide polymerization catalyst and an aliphatic saturated aldehyde consisting solely of hydrogen atoms, from two to eight carbon atoms and a single atom of oxygen, the amount of said aldehyde being 50% to 300% by weight of said monomer, and heating the mixture thus made to form an ungelled composition containing a fusible polymer in an amount which is at least one-third the quantity by weight of said monomer originally mixed.

2. Process for making artificial resins which comprises mixing a polyfunctional monomer of the group consisting of divinyl benzene and unsaturated esters of carboxylic acids, the esters containing at least two polymerizable ethylenic linkages, with an organic peroxide polymerization catalyst and an aliphatic saturated aldehyde consisting solely of hydrogen atoms, from two to eight carbon atoms and a single atom of oxygen, the amount of said aldehyde being 50% to 300% by weight of said monomer, and heating the mixture thus made to form an ungelled composition containing a fusible polymer in an amount which is at least one-half the quantity by weight of said monomer originally mixed.

3. Process for making artificial resins which comprises mixing a polyfunctional monomer of the group consisting of divinyl benzene and unsaturated esters of carboxylic acids, the esters containing at least two polymerizable ethylenic linkages, with an organic peroxide polymerization catalyst and an aliphatic saturated aldehyde consisting solely of hydrogen atoms, from two to eight carbon atoms and a single atom of oxygen, the amount of said aldehyde being 50% to 300% by weight of said monomer, and heating the mixture thus made to form an ungelled composition containing a fusible polymer in an amount which is at least one-half the quantity by weight of said monomer originally mixed, removing the aldehyde from the composition, and heating the remainder of the composition in shaped form to obtain an infusible material.

4. Process for making artificial resins which comprises mixing at least two different unsaturated esters of carboxylic acids, each of said esters containing at least two polymerizable ethylenic linkages, with an organic peroxide polymerization catalyst and an aliphatic saturated aldehyde consisting solely of hydrogen atoms, from two to eight carbon atoms, and a single atom of oxygen, the amount of said aldehyde being 50% to 300% by weight of said esters, and heating the mixture thus made to form an ungelled composition containing a fusible copolymer from said esters which is at least one-third the quantity by weight of said esters originally mixed.

5. Process for making artificial resins which comprises mixing diallyl maleate with an organic peroxide polymerization catalyst and an aliphatic saturated monoaldehyde consisting solely of hydrogen atoms, from two to eight carbon atoms, and a single atom of oxygen, the amount of said aldehyde being between 50% and 300% by weight of said allyl maleate, heating the mixture thus made to form an ungelled composition containing a fusible polymer from diallyl maleate in an amount which is at least one-third the quantity of said diallyl maleate originally mixed, and distilling the aldehyde from the composition.

6. Process as claimed in claim 5 in which the aldehyde is butyraldehyde.

7. Process as claimed in claim 5 in which the aldehyde is acetaldehyde.

8. Process as claimed in claim 5 in which the aldehyde is propionaldehyde.

9. Process as claimed in claim 5 in which the aldehyde is 2-ethylhexaldehyde.

BENJAMIN PHILLIPS, Jr.
WILLIAM M. QUATTLEBAUM, Jr.

REFERENCES CITED

The following references are of record in the file of this patent:

UNITED STATES PATENTS

| Number | Name | Date |
|---|---|---|
| 2,332,896 | D'Alelio | Oct. 26, 1943 |
| 2,332,900 | D'Alelio | Oct. 26, 1943 |
| 2,378,195 | D'Alelio | June 12, 1945 |
| 2,409,633 | Kropa | Oct. 22, 1946 |
| 2,416,536 | Neher | Feb. 25, 1947 |
| 2,437,962 | Kropa | Mar. 16, 1948 |

OTHER REFERENCES

Ser. No. 404,618, Hoffman (A. P. C.), published April 20, 1943.